Oct. 2, 1962     H. GOLDE     3,056,628
ELECTRIC CIRCUIT MAKING AND BREAKING DEVICE FOR
THE SLIDING PANEL OF A VEHICLE ROOF
Filed April 29, 1959
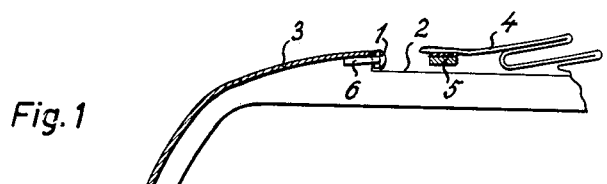
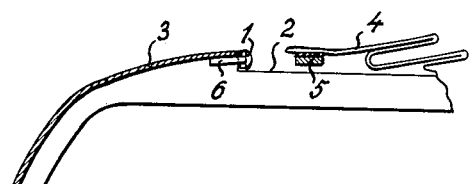
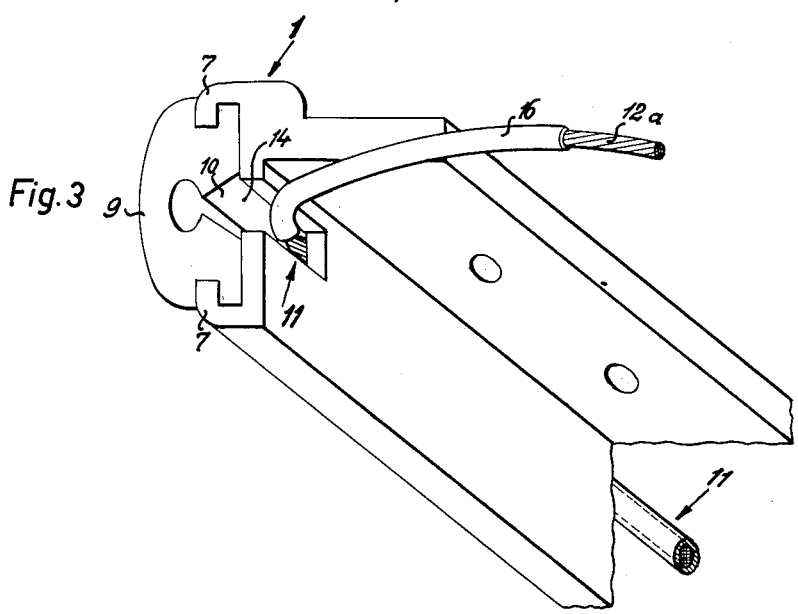
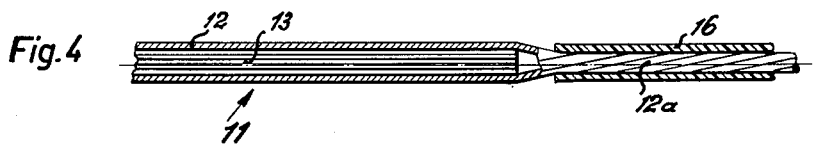

United States Patent Office 3,056,628
Patented Oct. 2, 1962

3,056,628
ELECTRIC CIRCUIT MAKING AND BREAKING DEVICE FOR THE SLIDING PANEL OF A VEHICLE ROOF
Hans Golde, 338 Hanauer Landstrasse,
Frankfurt, Germany
Filed Apr. 29, 1959, Ser. No. 809,845
6 Claims. (Cl. 296—137)

This invention relates to a switch for opening and closing an electric circuit.

In motor vehicles having electrically-driven sliding roofs it is known to dispose a switch device at the forward edge of the aperture in the roof which is adapted for being closed by the sliding roof. The purpose of such a switch device is to immediately stop the sliding roof, or to switch the roof drive to cause rearward travel of the roof, as soon as a sufficient pressure is exerted on the contact strip. The stopping or switching would occur if an obstacle is interposed between the forward edge of the aperture and the sliding roof during forward travel of the latter. The obstacle may be a part of a persons body or an article within or without the automobile. It will be apparent that such a device serves primarily to prevent accidents.

In known circuit making and breaking devices for this purpose, a metal bar mounted in resilient plastic material is disposed opposite a line of separate contacts between which are situated elastic spacer members which keep the metal bar at a distance from the contacts when no pressure is applied to the strip. Since the bar must always be curved to correspond to the curve of the roof, it is difficult to maintain accurate spacing from the contacts. A further disadvantage is that the plastic material becomes hard, and thus less resilient, at low temperatures so that during winter the pressure necessary for causing the bar to engage the contacts becomes so great that, in some cases, the safety device may fail to operate when necessary.

According to the invention there is provided an electrical switch which constitutes an electrical circuit making and breaking device. The switch comprises an elongated first contact member of electrically conductable material and an elongated strip member which is elastic and electrically insulating. The strip member is provided with a notch along its longitudinal extent and a flexible second contact member of electrically conductable material is supported in the notch. The notch has a cross sectional shape corresponding in part to the cross section of the second contact member in order to accommodate the same therein substantially parallel to the first contact member. The notch has a diverging portion which extends from the part corresponding to the cross section of the second contact member, which diverging portion, opens outwardly of the strip member to expose the second contact member with the latter in said notch. The second contact member is spaced from the first contact member and in facing relation therewith with the second contact member in said notch. The second contact member engages the first contact member when the strip member is deflected a distance corresponding to the spacing of the contact members for thereby activating the switch.

In order that the present invention may be clearly understood and readily carried into effect, reference will now be made, by way of example, to the accompanying drawings, in which:

FIGURE 1 shows, diagrammatically, a longitudinal sectional view through part of a motor vehicle roof, FIGURE 2 is a cross-sectional view in enlarged scale of a circuit making and breaking device attached to the roof as shown in FIGURE 1, FIGURE 3 is a perspective view of part of the device shown in FIGURE 2, and FIGURE 4 is a view of a conductive lead extending from the device.

Referring to the drawings, a circuit making and breaking device 1 is mounted along the forward edge of an aperture 2 in the fixed part 3 of the motor vehicle roof. The vehicle roof also includes a sliding part 4 which has a forward hood 5 and is shown approximately a quarter open. Bolted to the fixed roof is a connecting flange 6 which is integral with an E-section, light metal bar 7 for conducting electricity. The extreme ends of the two extreme ribs of the E-section bar 7 are inwardly turned and engage in gripping relation a strip-like member 9 which is made of soft, elastic, electrical-insulating material and which has formed therein, opposite a central rib 8 of the E-section, a notch having a diverging portion 10. At the base of the diverging portion 10 there is exposed a non-insulated, flexible, electrical conductor 11 embedded in the member 9 in such a manner that when the conductor 11 is in its unflexed position it extends adjacent and parallel to the rib 8 of the bar 7. The conductor 11 consists of a non-insulated copper core having a plurality of strands 13 and covered by a braided metal covering 12. The bar 7 is grounded and is attached to respective locations on the under side of the fixed roof. The ends of the bar extend beneath the respective longitudinal edge zones of the aperture 2.

When sufficient pressure is exerted on the member 9, the conductor 11 contacts the rib 8 at the location of the applied pressure.

Before the bar 7 is mounted on the roof, the bar 7 is provided at one end with a short slot 14 which is, for example, 1 cm. in length. Since each end of the bar extends beneath the adjacent longitudinal edge zone, the supply lead to the conductor 11 can be guided in hidden fashion from the slot 14, and none of the contact-making length of the conductor 11 is lost.

In order to arrange the supply lead so that the presence of a soldering point in the region of the contact strip 1 is avoided, a length of the metal covering 12 is drawn over the end of the strands 13 after the conductor has been cut to its final length. The drawn wires of the metal covering are then twisted together as shown at 12a in FIGURE 4. A flexible insulating tube 16 is then drawn over the zone 12a as far as the ends of the copper strands. The supply line can then be soldered to the relevant end of the metal covering 12.

The soft insulating material for the member 9 preferably consists of very soft rubber or foam rubber having a smooth surface.

I claim:

1. An electric switch for a motor vehicle having a fixed roof portion defining an aperture therein and a sliding roof portion adapted to close the aperture, said electric switch comprising: an elongated first contact member of electrically conductable material on the fixed roof portion, an elongated strip member which is elastic and electrically insulating attached to the first contact member, said strip member being provided with a notch along its longitudinal extent, a flexible second contact member of electrically conductable material, said notch having a cross sectional shape corresponding in part to the cross section of said second contact member for accommodating the same therein substantially parallel to said first contact member, said notch having a diverging portion extending from said part corresponding to the cross section of said second contact member and opening outwardly of said strip member to expose said second contact member with the latter in said notch, said second contact member being spaced from said first contact member and in facing relation therewith with the second contact member in said notch and with said sliding roof portion in retracted position, said second contact member engaging the first contact member with the strip member being deflected a distance corresponding to the spacing of the contact members thereby activating the switch.

2. An electric switch as claimed in claim 1 wherein said second contact member has a circular cross section and said notch is in part defined by a portion of a circle.

3. An electric switch as claimed in claim 2 wherein the circular portion of the notch has an angular extent greater than one hundred and eighty degrees.

4. A device as claimed in claim 1, wherein said first member is of E-shaped cross-section and includes upper and lower ribs in gripping relation with said strip member and a central rib disposed in said notch and opposite said second contact member.

5. A device as claimed in claim 4, further comprising a supporting member, a flange integral with said first member, and means attaching said flange to said supporting member.

6. A device as claimed in claim 1, wherein said second contact member consists of a stranded conductive wire and a metal covering directly thereon, said covering including portions extending beyond the end of the stranded wire to form a supply lead.

References Cited in the file of this patent

UNITED STATES PATENTS

| | | |
|---|---|---|
| 2,740,856 | Doeg | Apr. 3, 1956 |
| 2,768,025 | Spear et al. | Oct. 23, 1956 |
| 2,843,690 | Miller | July 15, 1958 |
| 2,869,923 | Mulichak | Jan. 20, 1959 |

FOREIGN PATENTS

| | | |
|---|---|---|
| 935,112 | Germany | Nov. 10, 1955 |
| 683,477 | Great Britain | Nov. 26, 1952 |